United States Patent
Averbuch et al.

(10) Patent No.: US 9,147,162 B2
(45) Date of Patent: Sep. 29, 2015

(54) METHOD FOR CLASSIFICATION OF NEWLY ARRIVED MULTIDIMENSIONAL DATA POINTS IN DYNAMIC BIG DATA SETS

(71) Applicants: Amir Averbuch, Tel Aviv (IL); Amit Bermanis, Rehovot (IL); Ronald R. Coifman, North-Haven, CT (US)

(72) Inventors: Amir Averbuch, Tel Aviv (IL); Amit Bermanis, Rehovot (IL); Ronald R. Coifman, North-Haven, CT (US)

(73) Assignee: ThetaRay Ltd., Hod Hashron (IL)

( * ) Notice: Subject to any disclaimer, the term of this patent is extended or adjusted under 35 U.S.C. 154(b) by 387 days.

(21) Appl. No.: 13/832,098

(22) Filed: Mar. 15, 2013

(65) Prior Publication Data

US 2013/0246325 A1     Sep. 19, 2013

Related U.S. Application Data

(60) Provisional application No. 61/611,282, filed on Mar. 15, 2012.

(51) Int. Cl.
  *G06F 17/00* (2006.01)
  *G06N 5/02* (2006.01)
  *G06F 17/30* (2006.01)

(52) U.S. Cl.
  CPC ............ *G06N 5/02* (2013.01); *G06F 17/30707* (2013.01)

(58) Field of Classification Search
  None
  See application file for complete search history.

(56) References Cited

U.S. PATENT DOCUMENTS

| | | | |
|---|---|---|---|
| 7,640,219 B2* | 12/2009 | Perrizo | 706/20 |
| 7,777,743 B2* | 8/2010 | Pao et al. | 345/428 |
| 8,019,702 B1* | 9/2011 | Gargi et al. | 706/12 |
| 8,073,659 B2* | 12/2011 | Gugaliya et al. | 703/2 |
| 8,355,998 B1* | 1/2013 | Averbuch et al. | 706/12 |
| 2002/0194159 A1* | 12/2002 | Kamath et al. | 707/2 |
| 2003/0009470 A1* | 1/2003 | Leary | 707/100 |
| 2003/0020732 A1* | 1/2003 | Jasa et al. | 345/645 |
| 2003/0065632 A1* | 4/2003 | Hubey | 706/15 |
| 2005/0253863 A1* | 11/2005 | Mitchell et al. | 345/582 |
| 2006/0017821 A1* | 1/2006 | Garvey et al. | 348/231.3 |
| 2006/0142990 A1* | 6/2006 | Vatchkov et al. | 703/23 |
| 2007/0162406 A1* | 7/2007 | Lanckriet | 706/20 |
| 2008/0181503 A1* | 7/2008 | Schclar et al. | 382/181 |
| 2009/0177597 A1* | 7/2009 | Dube et al. | 706/12 |

(Continued)

OTHER PUBLICATIONS

Ait-Sahalia et al., "Estimators of Diffusions With Randomly Spaced Discrete Observations: A General Theory," The Annals of Statistics, vol. 32, No. 5, pp. 2186-2222, 2004.*

(Continued)

*Primary Examiner* — Kakali Chaki
*Assistant Examiner* — Fuming Wu
(74) *Attorney, Agent, or Firm* — Nathan & Associates Patent Agents Ltd.; Menachem Nathan

(57) ABSTRACT

A method for classification of a newly arrived multidimensional data point (MDP) in a dynamic data uses multi-scale extension (MSE). The multi-scale out-of-sample extension (OOSE) uses a coarse-to-fine hierarchy of the multi-scale decomposition of a Gaussian kernel that established the distances between MDPs in a training set to find the coordinates of newly arrived MDPs in an embedded space. A well-conditioned basis is first generated in a source matrix of MDPs. A single-scale out-of-sample extension (OOSE) is applied to the newly arrived MDP on the well-conditioned basis to provide coordinates of an approximate location of the newly arrived MDP in an embedded space. A multi-scale OOSE is then applied to the newly arrived MDP to provide improved coordinates of the newly arrived MDP location in the embedded space.

16 Claims, 7 Drawing Sheets

(56) References Cited

U.S. PATENT DOCUMENTS

2009/0307248 A1* 12/2009 Moser et al. .................. 707/101
2010/0110103 A1* 5/2010 Ramirez et al. ............... 345/619
2013/0246325 A1* 9/2013 Averbuch et al. .............. 706/46

OTHER PUBLICATIONS

Alzate et al., "Multiway Spectral Clustering with Out-of-Sample Extensions through Weighted Kernel PCA", IEEE Transactions on Pattern Analysis and Machine Intelligence, vol. 32, No. 2, Feb. 2010.*

Bengio et al., "Out-of-Sample Extensions for LLE, Isomap, MDS, Eigenmaps, and Spectral Clustering", Technical Report 1238, D'epartement d'Informatique et Recherche Op'erationnelle, Jul. 25, 2003.*

Coifman et al., "Geometric harmonics: A novel tool for multiscale out-of-sample extension of empirical functions", Appl. Comput. Harmon. Anal. 21, pp. 31-52, 2006.*

Ding et al., "Linearized Cluster Assignment via Spectral Ordering", Proceedings, the 21st International Conference on Machine Learning, Banff, Canada, 2004.*

Liberty et al., "Randomized algorithms for the low-rank approximation of matrices", PNAS, vol. 104, No. 51, pp. 20167-20172, Dec. 18, 2007.*

Saul et al., "Think Globally, Fit Locally: Unsupervised Learning of Low Dimensional Manifolds", Journal of Machine Learning Research 4, pp. 119-155, 2003.*

Strange et al., "A Generalised Solution to the Out-of-Sample Extension Problem in Manifold Learning", Proceedings, Twenty-Fifth AAAI Conference on Artificial IntelligenceSan Francisco, Aug. 7, 2011-Aug. 11, 2011.*

Trosset, et al., "The Out-of-Sample Problem for Classical Multidimensional Scaling", Technical Report Jun. 2004, Department of Statistics, Indiana University, Feb. 10, 2008.*

R.R. Coifman, S. Lafon, "Diffusion Maps", Applied and Computational Harmonic Analysis, 21:5-30, 2006.

R.R. Coifman and S. Lafon, "Geometric Harmonics: A novel tool for multi-scale out-of-sample extension of empirical functions", Applied and Computational Harmonic Analysis, 21(1), 31-52, 2006.

W.H. Press et al., "Numerical Recipes in C", Cambridge University Press, 2nd Edition, 1992, p. 791-802.

H. Cheng, et al., "On the compression of low rank matrices", Siam J. Scientific Computing, vol. 26, 1389-1404, 2005.

P.G. Martinsson et al., "A randomized algorithm for the decomposition of matrices", Applied and Computational Harmonic Analysis, vol. 30 (1), 47-68, 2011.

G.H. Golub and C.F. Van Loan, "Matrix Computations", The John Hopkins University Press, 3rd Edition, 1996, Algorithm 5.4.1.

W.H. Press et al., "Numerical Recipes in C", Cambridge University Press, 2nd Edition, 1992, pp. 59-70.

* cited by examiner

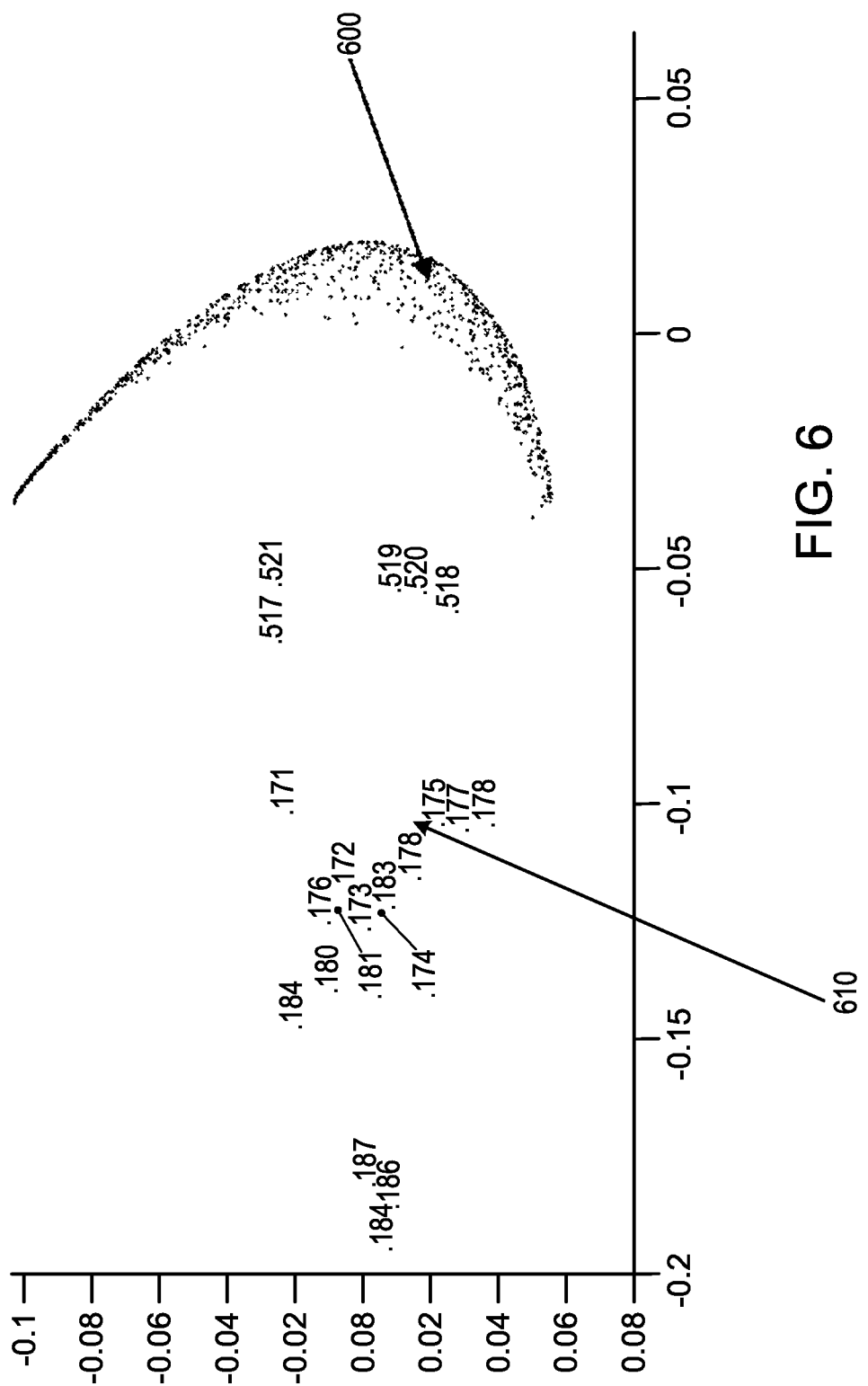

METHOD FOR CLASSIFICATION OF NEWLY ARRIVED MULTIDIMENSIONAL DATA POINTS IN DYNAMIC BIG DATA SETS

CROSS REFERENCE TO RELATED APPLICATIONS

This application claims the benefit of U.S. provisional patent application 61/611,282, filed Mar. 15, 2012, which is incorporated herein by reference in its entirety.

FIELD

Embodiments disclosed herein relate in general to classification of multidimensional (having a dimension equal to or greater than 2) data points (MDPs), in dynamic datasets and in particular to the computation of the location of a newly arrived MDP by using a multi-scale extension (MSE) method that maps (provides coordinates of) each such newly arrived MDP efficiently into a lower dimension "embedded" space.

BACKGROUND

Large dynamic multidimensional datasets ("big data") are common in a variety of fields. Exemplarily, such fields include finance, communication networking (i.e. protocols such as TCP/IP, UDP, HTTP, HTTPS, SCADA and cellular) and streaming, social networking, imaging, databases, e-mails, governmental database and critical infrastructures. In these, MDPs are accumulated constantly. A main goal in processing big data is to understand it and to extract intelligence from it. Big data can be described by hundreds or thousands of parameters (features). Consequently, in its original form in a source metric space, big data is incomprehensible to understand, to process, to analyze and to draw conclusions from.

Dimensionality reduction methods that embed data from a metric space, (where only the mutual distances or "affinities" between MDPs are given) into a lower dimension (vector) space are known. One such method involves diffusion maps ("DM"), see R. R. Coifman and S. Lafon, "Diffusion Maps", Applied and Computational Harmonic Analysis, 21:5-30, 2006. A kernel method such as DM assigns distances between MDPs. These distances quantify the affinities between the MDPs. In the DM method, a diffusion operator is first formed on the MDPs. Spectral decomposition of the operator then produces from the data a family of maps in a Euclidean space. This is an "embedded" MDP matrix. The Euclidean distances between the embedded MDPs approximate the diffusion distances between the MDPs in the source metric space, i.e. the diffusion distance becomes the transition probability in t time steps from one MDP to another. In the MDP matrix, each row contains one MDP. A spectral decomposition of the MDP matrix, whose dimensions are proportional to the size of the data, has high computational costs. One problem is to determine how a new, 'unseen' sample (newly arrived MDP) can be mapped into a previously learnt or established embedded lower-dimension space. The DM procedure in particular cannot be repeated constantly for each newly arrived MDP.

Consider as an example a simple classification problem involving a set of training samples and a separate set of test samples, the latter used to check the validity of the classification. If one wishes to reduce the dimensionality of these datasets so that one can perform the classification in a lower-dimension space, one option is to combine the training and test sets into one "combined" dataset and to perform the coordinate computation on this combined dataset before splitting into two sets again in the low-dimension space, Another option is to run the algorithm on the training set only, then apply what has been learnt from this process to map the test set into the lower-dimension space. The advantage of the latter approach is that it is not only potentially less computationally expensive, but also that new samples can be continually added to the lower-dimension embedding without the need to re-compute the lower-dimension space. This approach is commonly referred to as the "out-of-sample extension" or "OOSE".

In an OOSE problem, a new MDP needs to be mapped into a space that can be low-dimensional without affecting this space and without requiring a re-learning or change in the space parameterization for future learning. When the mapping is into a lower-dimension space it is also called "sampling" or "sub-sampling". One way to perform OOSE is by using a geometric harmonics methodology (see. e.g. R. R. Coifman and S. Lafon, "Geometric Harmonics: A novel tool for multi-scale out-of-sample extension of empirical functions", Applied and Computational Harmonic Analysis, 21(1), 31-52, 2006, referred to hereinafter as "GH"). Another way to perform OOSE is by using the Nystrom method (see C. T. H Baker, "The numerical treatment of integral equations", Oxford: Calrendon Press 1977 and W. H. Presse et al., "Numerical Recipes in C", Cambridge University Press, $2^{nd}$ Edition, 1992, page 791-802, hereinafter "Press").

The OOSE is performed on data in which the only known entities are the affinities between MDPs, as well as on empirical functions. The goal is to sub-sample big data and then to find the coordinates of a newly arrived MDP where only affinities between the source MDPs are given. The empirical functions (which may be for example either functions or mapping from one space to another such as embedding) are defined on MDPs and are employed for embedding newly arrived MDPs. The embedding occurs in a Euclidean space, determined once by a finite set of MDPs in a training process. The affinities between MDPs in an original source space (which form a training dataset) are converted into coordinates of locations in the embedded (Euclidean) space. The conversion of affinities of newly arrived MDPs into coordinates of locations in the embedded space is then done reliably and quickly without the need to repeat the entire computation, as done in training phase. To clarify, the training process is not repeated for each newly arrived MDP.

A numerical rank of a matrix is the number of numerically independent columns of the matrix. Suppose that $l^{(s)}$ is the numerical rank of a n×n Gaussian kernel matrix $G^{(s)}$ (EQ. 5) for a fixed scale s. To sub-sample correctly the data points, one needs to identify the $l^{(s)}$ columns in $G^{(s)}$ that constitute a well-conditioned basis for its numerical range. In other words, one needs to look for a $n \times l^{(s)}$ matrix $B^{(s)}$ whose columns constitute a subset of the columns of $G^{(s)}$ and for a $l^{(s)} \times n$ matrix $P^{(s)}$, such that $l^{(s)}$ of its columns make up an identity matrix and $B^{(s)}P^s \approx G^{(s)}$. Such matrix factorization is called interpolative decomposition ("ID"). The MDPs $D_3 = \{x_{s_1}, x_{s_2}, \ldots, x_{s_{l(s)}}\}$ associated with the columns of $B^{(s)}$ constitute the sampled dataset at scale s.

FIG. 1A is a flow chart illustrating a known method for determining a well-conditioned basis of an input MDP matrix. The MDP matrix serves as an input to a sampling phase in step 110. The MDP matrix is assumed to have Gaussian entities, in particular as computed by EQ. 3 below. Deterministic single scale MDP sampling using a deterministic interpolative decomposition (DID) algorithm is performed on the input data in step 120. The DID algorithm may be based exemplarily on H. Cheng et al., "On the compression of low rank matrices", SIAM J. Scientific Computing, Vol. 26, 1389-

1404, 2005. The output of step 120—a basis of the input data—is used as an input to a randomized interpolative decomposition (RID) algorithm, step 130. The RID algorithm may be based exemplarily on P. G. Martinsson et al., "A randomized algorithm for the decomposition of matrices", Applied and Computational Harmonic Analysis, Vol. 30 (1), 47-68, 2011. The output of the RID algorithm is a well-conditioned basis. Note that the use of DID and RID algorithms to generate a well-conditioned basis is exemplary, and the well-conditioned basis may be obtained in other ways. Details of the DID and RID algorithms are as follows:

DID Algorithm

Input: A m×n matrix A and integer k such that k<min {m,n}.
Output: A m×k matrix B whose columns constitute a subset of the columns of A and a k×n matrix P such that $\|A-BP\|_2 \leq \sqrt{4k(n-k)+1}\sigma_{k+1}(A)$, where $\sigma_{k+1}(A)$ is the k+1 largest singular value of the matrix A.
Process:

1. Apply exemplarily the pivoted QR routine (described in G. H. Golub and C. F. Van Loan, "Matrix Computations", The John Hopkins University Press, 3$^{rd}$ Edition, 1996, Algorithm 5.4.1) to A to obtain $AP_R=QR$, where $P_R$ is a N×n permutation matrix, Q is a m×m orthogonal matrix and R is a m×n upper triangular matrix, and where the absolute values on the diagonal are in decreasing orders.
2. Split R and Q such that $$R = \begin{bmatrix} R_{11} & R_{12} \\ 0 & R_{22} \end{bmatrix},$$

$Q=[Q_1\ Q_2]$, where $R_{11}$ is k×k, $R_{12}$ is k×(n−k), $R_{22}$ is (m−k)×(n−k), $Q_1$ is m×k and $Q_2$ is m×(m−k).
3. Define m×k matrix $B=Q_1 R_{11}$.
4. Define the k×n matrix $P=[I_k\ R_{11}^{-1}R_{12}]$ where $I_k$ is the k×k identity matrix.
End process.

RID Algorithm

Input: A m×n matrix A and two integers l<k such that k<min {m, n}.
Output: A m×l matrix B and a l×n matrix P that satisfy $\|A-BP\|_2 \leq l\sqrt{mn}\sigma_{l+1}(A)$, where $\sigma_{l+1}(A)$ is the l+1 largest singular value of matrix A.
Process:

1. Use a random number generator to form a real k×m matrix $G_\epsilon$ whose entries are independent and identically distributed (iid) Gaussian random variables of zero mean and unit variance. Compute the k×n product matrix $W=G_\epsilon A$, where $G_\epsilon$ is defined by EQs. 1 and 2, $$G_\varepsilon = \begin{pmatrix} g_\varepsilon(x_1, x_1) & g_\varepsilon(x_1, x_2) & \cdots & g_\varepsilon(x_1, x_n) \\ g_\varepsilon(x_2, x_1) & g_\varepsilon(x_2, x_2) & \cdots & g_\varepsilon(x_2, x_n) \\ \vdots & \vdots & \ddots & \vdots \\ g_\varepsilon(x_n, x_1) & g_\varepsilon(x_n, x_2) & \cdots & g_\varepsilon(x_n, x_n) \end{pmatrix} \quad (1)$$

where the entries are the affinities matrix given by $$(G_\varepsilon)_{i,j} = g_\varepsilon(x_i, x_j) = \exp(-\|x_i-x_j\|^2/\varepsilon), \ i,j=1, 2, \ldots, n \quad (2)$$

and where $\|\cdot\|$ is a metric on the space.

2. Using the DID algorithm, form a k×l matrix S whose columns constitute a subset of the columns of W and a real l×n matrix P such that $\|SP-W\|_2 \leq \sqrt{4l(n-l)+1}\sigma_{l+1}(W)$.
3. There exists a finite sequence $i_1, i_2, \ldots, i_l$ of integers such that for any j=1, ..., l, the j$^{th}$ column of S is the $i_j$ column of W. Collect the corresponding columns of A into a real m×l matrix B so that for any j=1, ..., l, the j$^{th}$ column of B is the $i_j^{th}$ column of A. Then, the sampled dataset is $D_s=\{x_{i_1}, \ldots, x_{i_l}\}$.
End process.

The GH and Nystrom OOSE schemes have three significant disadvantages: (1) the diagonalization of the kernel costs $O(n^3)$ operations where $n^2$ is the size of the matrix; (2) the kernel may be ill-conditioned due to a fast decay of its spectrum, i.e. it becomes numerically non-invertible; and (3), it is unclear how to choose the length parameter in the kernel, since the output is sensitive to this choice.

There is therefore a need for, and it would be advantageous to have a method for big data sampling and extension and for classification of multidimensional data points in big data that does not suffer from the disadvantages listed above.

SUMMARY

Method embodiments disclosed herein teach classification of multidimensional data points in big data (MDP matrices) through computation of locations of newly arrived MDPs using a multi-scale extension (MSE) method that maps such MDPs efficiently into a lower-dimension space. Such classification is exemplarily needed for many useful purposes, for example for finding anomalies in big data, cyber security, process control, performance monitoring, fraud detection, trend identification, etc. The MSE method includes a single-scale OOSE step and a multi-scale OOSE step. To clarify, as used herein, "single-scale OOSE" refers to OOSE performed with a scale parameter s =0, and "multi-scale OOSE" refers to OOSE performed with s≥1.

The MSE disclosed herein replaces the known GH and Nystrom extensions. In order to know the coordinates of newly arrived MDPs, given mutual distances between MDPs in a training set are converted by the MSE into coordinates of locations of these MDPs in an embedded space. The MSE uses a coarse-to-fine hierarchy of the multi-scale decomposition of a Gaussian kernel that established the distances between MDPs in the training set to find the coordinates of newly arrived MDPs in the embedded space. The first step in the MSE operation is the determination of a well-conditioned basis of an input MDP matrix, exemplarily using RID. The MSE generates a sequence of approximations to a given empirical function or to a given mapping on a set of MDPs, as well as their OOSE to any newly-arrived MDP. The result is a set of coordinates for each newly arrived MDP.

In an embodiment there is provided a method for classification of a newly arrived MDP in a dynamic data set, comprising the steps of: generating a well-conditioned basis in a source matrix of multidimensional data points; applying a single-scale (s=0) OOSE to the newly arrived MDP on the well-conditioned basis to provide coordinates of an approximate location of the newly arrived MDP in an embedded space; and applying a multi-scale (s≥1) OOSE to the newly arrived MDP to provide improved coordinates of the newly arrived MDP location in the embedded space, thereby classifying the newly arrived MDP in relation to the source matrix multidimensional data points of the dynamic data set.

In an embodiment, the step of applying a multi-scale OOSE to the newly arrived MDP includes applying the multi-scale OOSE to the newly arrived MDP on the well-conditioned basis.

BRIEF DESCRIPTION OF THE DRAWINGS

Aspects, embodiments and features disclosed herein will become apparent from the following detailed description when considered in conjunction with the accompanying drawings, in which:

FIG. 6 shows yet another set of experimental results for networking data using sub-sampling and OOSE according to a method disclosed herein.

DETAILED DESCRIPTION

Figure 1A:
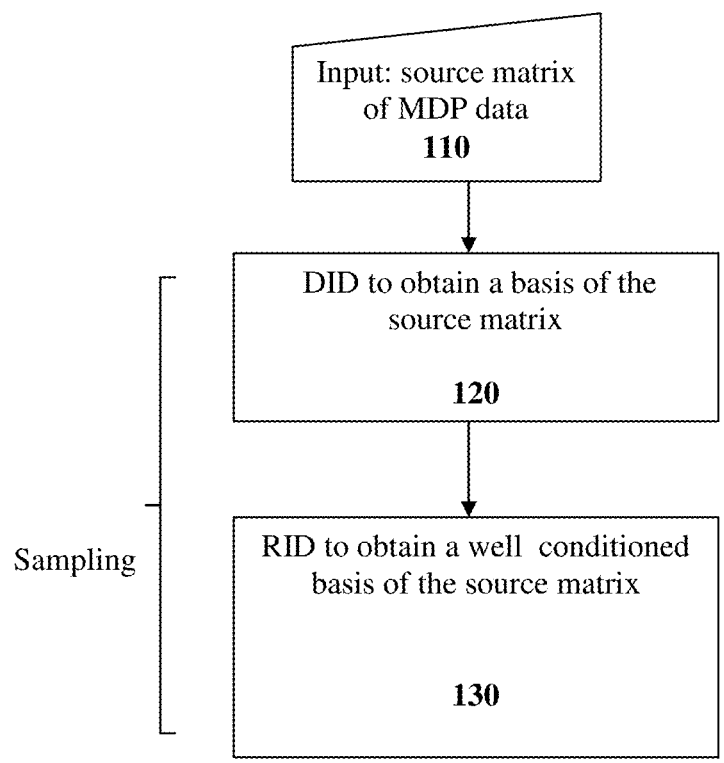
FIG. 1A is a flow chart illustrating a known method for determining a well-conditioned basis in a MDP matrix.
Figure 1B:
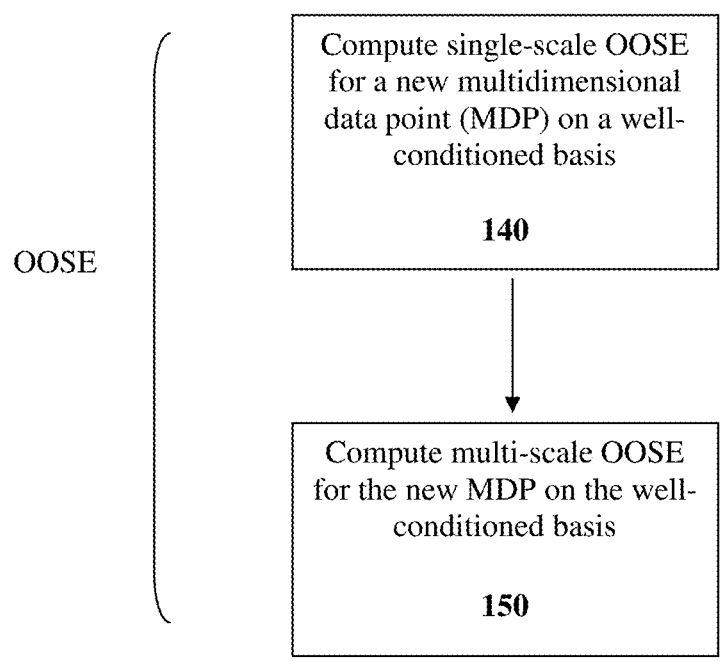
FIG. 1B is a flow chart illustrating the main steps in a method for classification of newly arrived multidimensional data points in dynamic big data sets disclosed herein.
Figure 2:
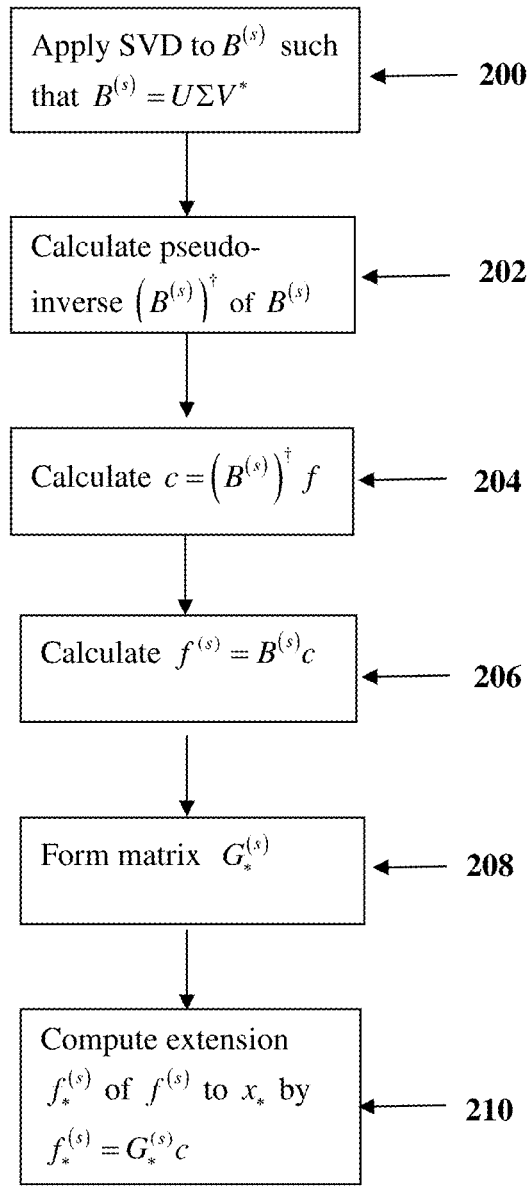
FIG. 2 is a flow chart illustrating sub-steps of the single-scale OOSE step in the method of FIG. 1.

FIG. 1B is a flow chart illustrating the main steps in a method for classification of newly arrived multidimensional data points in dynamic big data sets disclosed herein. The input to the sampling and extension stages is a well-conditioned basis generated (exemplarily by RID) as in step 130, FIG. 1A, and a newly arrived MDP denoted by The input to FIG. 2 is a product of two matrices that approximates well the input MDP matrix, where one matrix is a well conditioned basis of the input MDP matrix. In step 140, single-scale OOSE is computed for the newly arrived MDP on the well-conditioned basis generated in step 130. In step 150, multi-scale OOSE is computed for the same $x_*$ on the well-conditioned basis. Details of steps 140 and 150 are given in, respectively, FIGS. 2 and 3 and in their description below.

$G_\epsilon$ defined in EQ. 1 is now computed using a multi-scale approach as follows: define a sequence of Gaussian kernel matrices $G_s$, $s=0, 1, \ldots$, whose entries are $$(G_s)_{i,j} = g_{\epsilon_s}(x_i, x_j), \quad (3)$$

where $\epsilon_s$ is a positive monotonic decreasing function of the scale parameter s that tends to zero as s tends to infinity. $g_{\epsilon_s}(x_i, x_j)$ is defined by EQ. 2. Exemplarily, we can choose $\epsilon_s = 2^{-s}$, $s=0, 1, \ldots$. We identify a well-conditioned basis in A by applying the RID algorithm to $G_s$ (EQ. 3). This represents sub-sampling of the source raw MDP data in A. The OOSE is done for an empirical function, but is also applicable to multidimensional data points that are not described by the empirical function.

Assume we have an empirical function $f=[f_1, \ldots, f_n]^T$ on a dataset $D=\{x_1, \ldots, x_n\}$ in $\mathbb{R}^d$ ($f_i f(x_i)$, $x_i \in \mathbb{R}^d$, $i=1, \ldots, n$). This means that each $x_i \in \mathbb{R}^d$, $i=1, \ldots, n$, is a vector of d features in a Euclidean space of dimension d. The goal is to extend $f$ via OOSE to any MDP in $\mathbb{R}^d$ by a superposition of Gaussians centered at D. This can be done for example by using the Nystrom extension in the following way:

1. Calculate the coordinates vector $c=(c_1, \ldots, c_n)^T$ of $f$ in the basis of $G_\epsilon$ (EQ. 2) columns such that $c = G_\epsilon^{-1} f$.

2. Extend $f$ to $x_* \in \mathbb{R}^d$ by an extension of the Gaussians to $x_*$ such that $$f_* = \sum_{j=1}^{N} g_\epsilon(x_*, x_j) c_j. \quad (4)$$

Thus, we define the notation in EQ. (3) to be $$G^{(s)} = G_{\epsilon_s}, \quad (5)$$

where $\{\epsilon_s = 2^{-1}\}_{s=0}^\infty$ is a decreasing positive sequence that tends to zero as s tends to infinity. We use the following multi-scale two-phase scheme:

1. Sampling: a well-conditioned basis of $G^{(s)}$'s (EQ. 5) columns is identified. Accordingly, the sampled dataset is the set of MDPs associated with these columns. This overcomes the problem arising from the numerical singularity of $G^{(s)}$.

2. OOSE: an empirical function $f$ is projected on this basis. Then, $f^{(s)}$, which is the projection of $f$ on this basis, is extended by a continuous extension of the involved Gaussians to $x_*$ in a way similar to EQ. (4).

$f$ does not have to be equal to its projection $f^{(s)}$. In this case (when f is not equal to its projection), we apply the procedure to $f - f^{(s)}$ with $G^{(s+1)}$. This way we obtain a multi-scale scheme for data sampling and OOSE. The OOSE is achieved by sampling and by a two-phase multi-scale scheme.

Once RID is applied to $G^{(s)}$, the columns of $B^{(s)}$ constitute a well-conditioned basis for the columns of $G^{(s)}$. A single scale extension (below) is used to extend the orthogonal projection of $f=[f_1, \ldots, f_n]^T$ on $B^{(s)}$ to a newly-arrived MDP $x_* \in \mathbb{R}^d \setminus D$ that belongs to $\mathbb{R}^d$ ($x_*$ is a vector of d features) and does not belong to D. For this we need the following notation:

$$G_*^{(s)} = [g_{\epsilon_s}(x_*, x_{s_1}), g_{\epsilon_s}(x_*, x_{s_2}), \ldots, g_{\epsilon_s}(x_*, x_{sl(s)})], \quad (6)$$

where $g_{\epsilon_s}$ is given in EQ. 3 with the standard Euclidean norm in $\mathbb{R}^d$.

Single-Scale OOSE (Step 140)

The single-scale OOSE step is described in more detail with reference to FIG. 2. This extension is done as follows:

Input: A $n \times l^{(s)}$ matrix $B^{(s)}$, the associated sampled data $D_s = \{x_{s_1}, \ldots, x_{sl(s)}\}$, a new MDP $x_*$, an empirical function $f=[f_1, \ldots, f_n]^T$ to be out-of-sample extended and a length parameter $\epsilon_s$.

Output: The projection $f^{(s)} = [f_1^{(s)}, \ldots, f_n^{(s)}]^T$ of f on $B^{(s)}$ and its extension $f_*^{(s)}$ to $x_*$—step 210.

Process:

1. Step 200—apply a singular value decomposition ("SVD") to $B^{(s)}$ (see e.g. Press, pages 59-70) such that $B^{(s)} = U\Sigma V^*$.

2. Step 202—calculate the pseudo-inverse $(B^{(s)})^\dagger = V\Sigma^{-1} U^*$ of $B^{(s)}$.

3. Step 204—calculate the coordinates' vector of the orthogonal projection of $f^{(s)}$ on the range of $B^{(s)}$ in the basis of the columns of $B^{(s)}$ $c=(B^{(s)})^\dagger f$.

4. Step 206—calculate the orthogonal projection of $f$ on the columns of $B^{(s)}$, $f^{(s)} = B^{(s)} c$.

5. Step 208—form the matrix $G_*^{(s)}$ from EQ. 6.

6. Step 210—calculate the extension $f_*^{(s)}$ of $f^{(s)}$ to $x_*$:

$$f_*^{(s)} = G_*^{(s)} c. \quad (7)$$

End process

Due to EQ. (7), $f^{(s)}$ is a linear combination of $l^{(s)}$ Gaussians with a fixed length parameter $\epsilon_s$.

Multi-Scale Data OOSE (Step 150)

Figure 3:
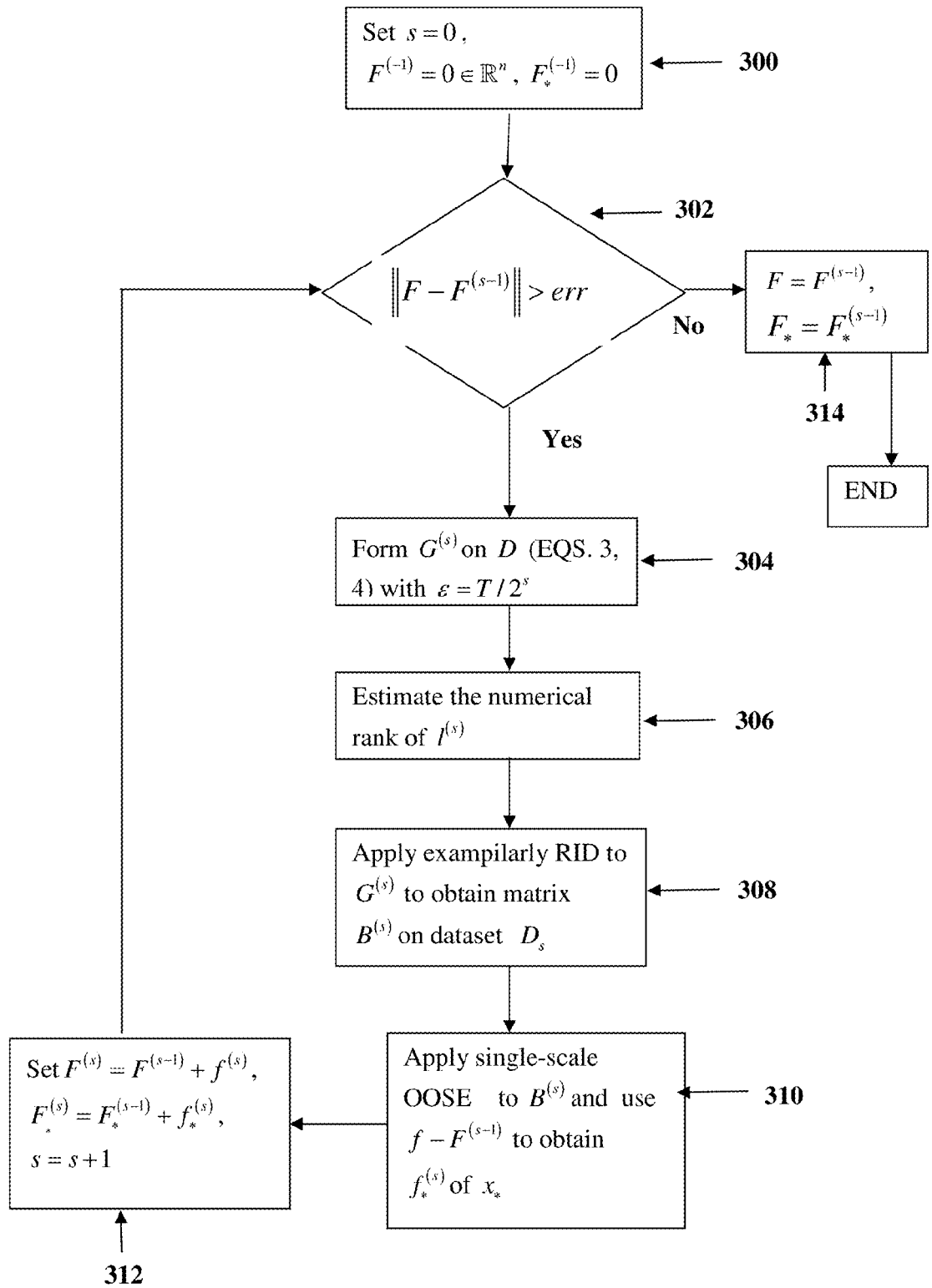
FIG. 3 is a flow chart illustrating sub-steps of the multi-scale data sampling and the multi-scale OOSE steps in the method of FIG. 1.

The multi-scale data OOSE is described in detail with reference to FIG. 3. The input parameters to this procedure are explained in more detail below. As mentioned, step 150 performs OOSE of $f$ to $x_*$ while producing a sequence of sampled datasets. For s=0, single-scale OOSE (step 140 in FIG. 1B) is applied to $f$ to obtain $f^{(0)}$. If $\|f-f^{(0)}\|$ (step 302) is not sufficiently small (the criterion for this and the norm $\|\cdot\|$ are determined by the user), then single-scale OOSE (step 140 in FIG. 1B) is applied again to the difference $f|f^0$ s=1, and so on. Thus, we use the MDPs in D as a test set for our OOSE.

Input: A dataset $D=\{x_1, \ldots, x_n\}$ in $\mathbb{R}^d$, a positive number T>0, a new multidimensional MDP $x_* \in \mathbb{R}^d \setminus D$ that does not belong to D, the numerical rank $l^{(s)}$ of $G^{(s)}$, an empirical function $f=[f_1, \ldots, f_n]^T$ to for the OOSE of $x_*$ and an error parameter err≥0.

Output: An approximation $F=[F_1, \ldots, F_n]^T$ of $f$ on D and its OOSE $F_*$ to $X_*$—step 312 in FIG. 3.

Process:
1. Step 300—set the scale parameter s=0, $F^{(-1)}=0 \in \mathbb{R}^n$ and $F_*^{(-1)}=0$. $\mathbb{R}^n$ is Euclidean vector space where each element in the space is a vector of size n.
2. Step 302—WHILE $\|F-F^{(s-1)}\|$>err DO
   a. Step 304—form the Gaussian kernel $G^{(s)}$ on D (see EQS. 3 and 4)

with $\varepsilon_s = \dfrac{T}{2^s}$.

b. Step 306—estimate the numerical rank $l^{(s)}$ of $G^{(s)}$ by computing $$\left(\dfrac{2}{\pi}\sqrt{\ln(\delta^{-1})}\right) \cdot P$$

where P is the minimal cover of the cubes of volume ($\sqrt{\varepsilon}^d$) that are associated with $G^{(s)}$.

c. Step 308—apply RID to $G^{(s)}$ with the parameters $l^{(s)}$ and $l^{(s)}+8$ (where 8 is just one possibility) to get an $n \times l^{(s)}$ matrix $B^{(s)}$ and the sampled dataset $D_s$.

d. Step 310—apply single-scale OOSE of step 140 in FIG. 1 to $B^{(s)}$ and $f-F^{(s-1)}$. We get the approximation $f^{(s)}$ to $f-F^{(s-1)}$ at scale s and its OOSE $f_*^{(s)}$ to $x_*$ e. Step 312—set $F^{(s)}=F^{(s-1)}-f^{(s)}$, $F_*^{(s)}=F_*^{(s-1)}+f_*^{(s)}$, s=+1.
3. ENDWHILE
4. Step 314—$F=F^{(s-1)}$ and $F_*=F_*^{(s-1)}$.

End process

The input parameters to the multi-scale OOSE are chosen in the following way: T is the length parameter of the Gaussian kernel matrix at the first scale of the algorithm. Therefore, in order to capture $x_*$, we set T to be T=max{dist($x_*$,D), κ(D)} where $$\kappa(D) = 2\left(\dfrac{\text{diameter}(D)}{2}\right)^2.$$

diameter (D) is the distance between MDPs of the most distant pair in D. This choice of T ensures that in the first scale the influence of D on $x_*$ is significant, and that D is covered by a single Gaussian. err is a user defined accuracy parameter. If we take err=0, then F=$f$, i.e. we have a multi-scale interpolation scheme. An err too large may result in inaccurate approximation of $f$. Typically, we take δ=0.1, which guarantees that $B^{(s)}$ is well-conditioned and, as a consequence, guarantees the robustness of the multi-scale data OOSE.

Experimental Results

Figure 4:
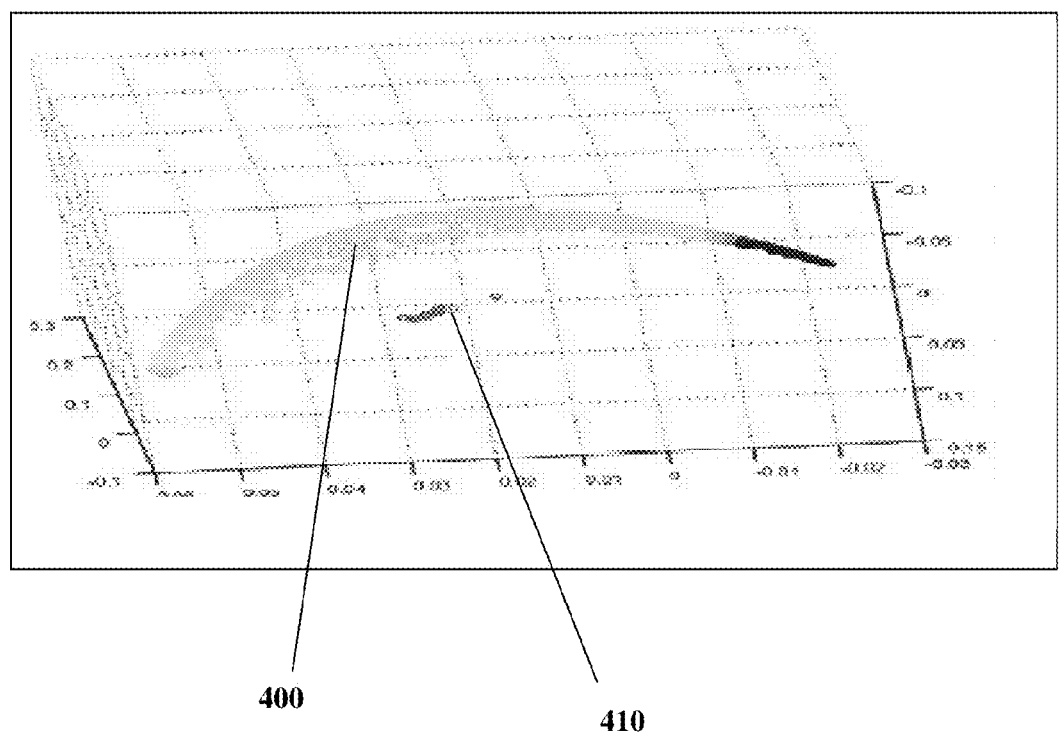
FIG. 4 shows one set of experimental results for networking data using sub-sampling and OOSE according to a method disclosed herein.
Figure 5:
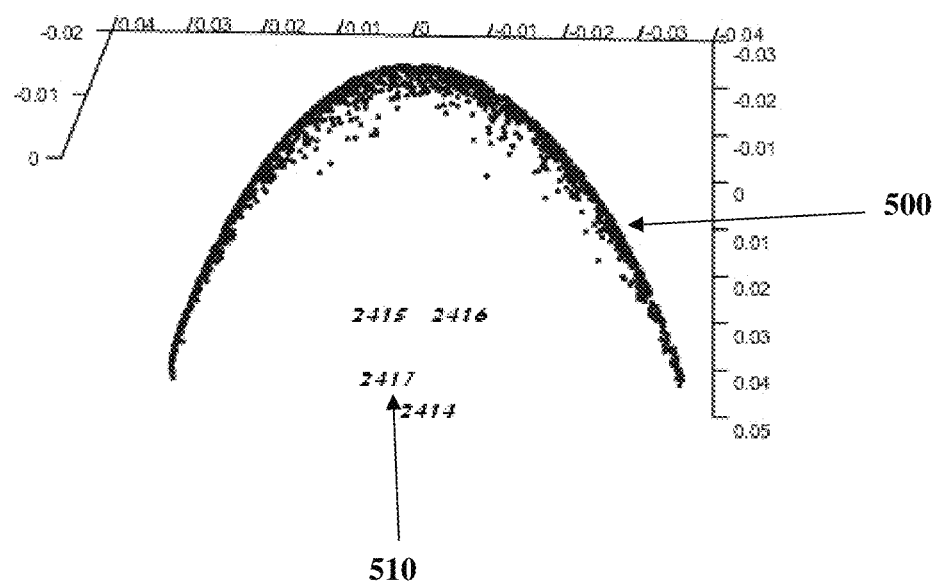
FIG. 5 shows another set of experimental results for networking data using sub-sampling and OOSE according to a method disclosed herein.

FIGS. 4-6 show three different sets of experimental results for networking data using sub-sampling and OOSE according to a method disclosed herein. The experimental results were obtained through application of the sampling procedure steps 120 and 130 and the OOSE procedure steps 140 and 150 to networking data. The networking MDPs were network packets and networking sessions. Three different training MDPs were assembled from different days and from different sources of networking data. At least one manifold, which describes the behavior of the training data in a lower-dimension space, is called a normal profile. These three normal profiles from the three networking MDPs are shown as 'horseshoes' (clusters of dense MDPs) by 400, 500 and 600 in FIGS. 4, 5 and 6, respectively. The clusters in FIGS. 4, 5 and 6 are the embedded MDPs after the application of dimensionality reduction and embedding of the trained data using DM. The X-, Y- and Z- coordinates in these figures represent the first, second and third eigenvectors of the first, second and third eigenvalue, respectively. The outputs are presented after the derivation of the embedding matrix.

During the testing stage, new MDPs, which did not participate in the training procedure (training phase), arrived constantly. To find the locations of the newly arrived MDPs in the embedded space, multi-scale OOSE as described herein was applied to each newly arrived MDP to find its coordinates. Computed coordinates of the newly arrived MDPs are shown by 410, 510 and 610 in FIGS. 4, 5 and 6, respectively. Since the networking data is labeled, we were able to verify the correctness of these coordinates.

The various features and steps discussed above, as well as other known equivalents for each such feature or step, can be mixed and matched by one of ordinary skill in this art to perform methods in accordance with principles described herein. Although the disclosure has been provided in the context of certain embodiments and examples, it will be understood by those skilled in the art that the disclosure extends beyond the specifically described embodiments to other alternative embodiments and/or uses and obvious modifications and equivalents thereof. Accordingly, the disclosure is not intended to be limited by the specific disclosures of embodiments herein. For example, any digital computer system can be configured or otherwise programmed to implement the methods disclosed herein, and to the extent that a particular digital computer system is configured to implement the methods of this invention, it is within the scope and spirit of the disclosed embodiments. Once a digital computer system is programmed to perform particular functions pursuant to computer-executable instructions from program software that implements the method embodiments disclosed herein, it in effect becomes a special purpose computer particular to the invention embodiments disclosed herein. The techniques necessary to achieve this are well known to those skilled in the art and thus are not further described herein.

Computer executable instructions implementing the methods and techniques of the present invention can be distributed to users on a computer-readable medium and are often copied onto a hard disk or other storage medium. When such a program of instructions is to be executed, it is usually loaded into the random access memory of the computer, thereby configuring the computer to act in accordance with the techniques disclosed herein. All these operations are well known to those skilled in the art and thus are not further described herein. The term "computer-readable medium" encompasses distribution media, intermediate storage media, execution memory of a computer, and any other medium or device capable of storing for later reading by a computer a computer program implementing the present invention.

All patents and publications mentioned in this specification are herein incorporated in their entirety by reference into the specification, to the same extent as if each individual patent and publication was specifically and individually indicated to be incorporated herein by reference. In addition, citation or identification of any reference in this application shall not be construed as an admission that such reference is available as prior art to the present application.

What is claimed is:

1. A method for classification of a newly arrived multidimensional data point (MDP) in a dynamic data set, comprising the steps of:
   a) generating a well-conditioned basis in a source matrix of multidimensional data points;
   b) applying a single-scale out-of-sample extension (OOSE) to the newly arrived MDP on the well-conditioned basis to provide coordinates of an approximate location of the newly arrived MDP in an embedded space; and
   c) applying a multi-scale OOSE to the newly arrived MDP to provide improved coordinates of the newly arrived MDP location in the embedded space, thereby classifying the newly arrived MDP in relation to the source matrix multidimensional data points of the dynamic data set.

2. The method of claim 1, wherein the step of generating a well-conditioned basis includes generating the well-conditioned basis using a randomized interpolative decomposition (RID) algorithm.

3. The method of claim 1, wherein the source matrix associated with a Gaussian kernel matrix, and wherein the step of applying a single-scale OOSE includes decomposing the associated Gaussian kernel matrix in the single scale, thereby obtaining the coordinates of the approximate location of the newly arrived MDP in the embedded space.

4. The method of claim 3, wherein the step of applying a multi-scale OOSE includes decomposing the associated Gaussian kernel matrix in a multi-scale, thereby obtaining the coordinates of the improved location of the newly arrived MDP in the embedded space.

5. The method of claim 2, wherein the source matrix associated with a Gaussian kernel matrix, and wherein the step of applying a single-scale OOSE includes decomposing the associated Gaussian kernel matrix in the single scale, thereby obtaining the coordinates of the approximate location of the newly arrived MDP in the embedded space.

6. The method of claim 5, wherein the step of applying a multi-scale OOSE includes decomposing the associated Gaussian kernel matrix in a multi-scale, thereby obtaining the coordinates of the improved location of the newly arrived MDP in the embedded space.

7. The method of claim 1, wherein the step of applying a multi-scale OOSE to the newly arrived MDP includes applying the multi-scale OOSE to the newly arrived MDP on the well-conditioned basis.

8. The method of claim 7, wherein the step of generating a well-conditioned basis includes generating the well-conditioned basis using a randomized interpolative decomposition (RID) algorithm.

9. The method of claim 7, wherein the source matrix associated with a Gaussian kernel matrix, and wherein the step of applying a single-scale OOSE includes decomposing the associated Gaussian kernel matrix in the single scale, thereby obtaining the coordinates of the approximate location of the newly arrived MDP in the embedded space.

10. The method of claim 9, wherein the step of applying a multi-scale OOSE includes decomposing the associated Gaussian kernel matrix in a multi-scale, thereby obtaining the coordinates of the improved location of the newly arrived MDP in the embedded space.

11. The method of claim 8, wherein the source matrix associated with a Gaussian kernel matrix, and wherein the step of applying a single-scale OOSE includes decomposing the associated Gaussian kernel matrix in the single scale, thereby obtaining the coordinates of the approximate location of the newly arrived MDP in the embedded space.

12. The method of claim 11, wherein the step of applying a multi-scale OOSE includes decomposing the associated Gaussian kernel matrix in a multi-scale, thereby obtaining the coordinates of the improved location of the newly arrived MDP in the embedded space.

13. The method of claim 1, wherein the dataset includes a big data set.

14. The method of claim 1, wherein the data set includes a network traffic dataset.

15. The method of claim 7, wherein the dataset includes a big data set.

16. The method of claim 7, wherein the data set includes a network traffic dataset.

* * * * *